Jan. 13, 1959      R. K. AITKEN      2,868,970

SIGNAL-TO-NOISE RESPONSIVE SYSTEM

Filed Oct. 27, 1953      2 Sheets-Sheet 1

United States Patent Office 2,868,970
Patented Jan. 13, 1959

2,868,970

SIGNAL-TO-NOISE RESPONSIVE SYSTEM

Robert K. Aitken, Port Washington, N. Y., assignor to Hazeltine Research, Inc., Chicago, Ill., a corporation of Illinois Application October 27, 1953, Serial No. 388,519

2 Claims. (Cl. 250—27)

This invention relates to signal-to-noise responsive systems and, more particularly, to such systems of the type which indicates the signal-to-noise power ratio of a circuit such as a radar receiver being subjected to a sensitivity test.

One signal-to-noise responsive system heretofore proposed comprises a power-indicating meter for providing distinct indications of the noise and signal-plus-noise powers of a receiver being tested by the application of a continuous-wave signal thereto. This system has the disadvantage that it offers no reliable indication of the true receiver performance in the presence of pulse-type signals.

In lieu of a continuous-wave signal, a pulse-type signal having an appreciable duty cycle may be applied to the receiver, causing the meter to indicate the combined average power of the pulse-type signal and the noise. This system has the limitation that pulse-type signals of small duty cycle cannot be utilized to test receiver sensitivity because the average power of the pulse-type signal is insufficient to provide a discernible meter indication above that caused by noise alone.

Another system heretofore proposed for measuring receiver sensitivity employs a cathode-ray oscilloscope. The desired comparison of noise and signal then is indicated by the relative noise and signal amplitudes displayed on the oscilloscope screen. While this system may be utilized in testing receivers by the application of pulses of small duty cycle, accurate comparisons of the noise-amplitude and signal-amplitude indications cannot readily be made because of the random noise variations and errors in human judgment.

It is an object of the present invention, therefore, to provide a new and improved signal-to-noise responsive system which avoids one or more of the above-mentioned limitations of such systems heretofore proposed.

It is a further object of the invention to provide a new and improved signal-to-noise responsive system for providing signals accurately representative of noise power and signal-plus-noise power in response to pulses of small duty cycle applied thereto.

It is another object of the invention to provide a new and improved signal-to-noise responsive system for providing precisely readable indications of noise power and noise-plus-signal power in response to pulses of small duty cycle applied thereto.

In accordance with the invention, a signal-to-noise responsive system comprises first circuit means for supplying a noise signal having a predetermined average power. The system also includes second circuit means including signal-attenuating circuit means for supplying a signal comprising periodic-pulse components of adjustable power and attenuated components of the noise signal. The system further includes a triggered pulse generator selectively coupled to the first circuit means and having a first trigger rate representative of the average noise-signal power or to the second circuit means and having a second trigger rate representative of the average power of the periodic-pulse and noise components during the pulse intervals. The second trigger rate is adjustable to substantial equality with the first rate in response to adjustment of the average periodic-pulse power during the pulse intervals. The first and second trigger rates are jointly representative of the relative average powers of the periodic-pulse and noise components during the pulse intervals.

For a better understanding of the present invention, together with other and further objects thereof, reference is had to the following description taken in connection with the accompanying drawings, and its scope will be pointed out in the appended claims.

Referring to the drawings.

Figure 1:
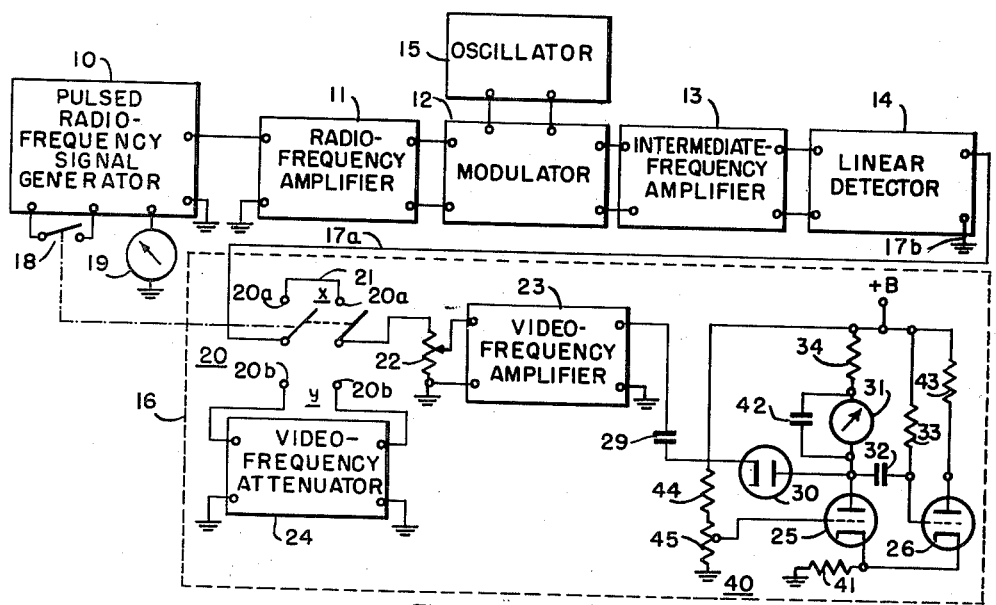
Fig. 1 is a circuit diagram, partly schematic, of a system for testing the sensitivity of a receiver including a signal-to-noise responsive system in accordance with the present invention.

Description of Fig. 1 system

Referring now to Fig. 1 of the drawings, the system for testing receiver sensitivity there represented comprises a pulsed radio-frequency signal generator 10 of conventional construction. There preferably is coupled to the signal generator 10, in cascade, and in the order named, a radio-frequency amplifier 11, modulator 12, intermediate-frequency amplifier 13, and a linear detector 14. An oscillator 15 is connected to the modulator 12. The units 11–15, inclusive, represent a conventional superheterodyne radar receiver having electrical noise generated therein. The detector 14 is coupled to a signal-to-noise responsive system 16, constructed in accordance with the present invention, by means of conductors 17a and 17b.

The signal generator 10 includes a switch 18 for disabling the generator and a meter 19 for indicating the output power thereof. The signal generator 10 and the units 11–15, inclusive, comprising the radar receiver may be of conventional construction and operation so that a detailed description and explanation of the operation thereof are unnecessary herein.

Referring now more particularly to the system 16 embodying the present invention, the signal-to-noise responsive system 16 comprises a first circuit means for supplying a noise signal having a predetermined average power. The first circuit means includes the conductors 17a and 17b coupled through a double-pole, double-throw switch 20 to a voltage divider 22. A conductor 21 is coupled between the terminals 20a, 20a at a first position x of the switch 20. The first circuit means also includes a video-frequency amplifier 23 coupled to the voltage divider 22. The switch 20 is so ganged to the switch 18 of the signal generator 10 that when switch 18 is open, the switch 20 is in a first operating position x for enabling the first circuit means to supply a noise signal.

The signal-to-noise responsive system 16 further includes second circuit means for supplying a signal comprising attenuated components of the noise signal and periodic-pulse components of adjustable power having pulse intervals of, for example, 1/10 microsecond duration and intervening intervals of, for example, 500 microseconds duration between pulses. The second circuit means includes the conductors 17a and 17b coupled to the voltage divider 22 and the video-frequency amplifier 23 through the double-pole, double-throw switch 20 and also includes signal-attenuating circuit means comprising a video-frequency attenuator 24 having, for example, an attenuation factor of 3 decibels and coupled between the terminals 20b, 20b at a second position y of the switch 20. The switch 20 is so ganged to the switch 18 of the signal generator 10 that when the switch 18 is closed, the switch 20 is in the second operating position y, thus causing the second circuit means to supply a signal comprising periodic-pulse components and attenuated components of the noise signal through the attenuator 24. The video-frequency amplifier 23 and the video-frequency attenuator 24 may be of conventional construction and preferably have linear input-output signal-translating characteristics.

The signal-to-noise responsive system 16 additionally includes a threshold-type circuit responsive only to signal impulses which exceed a predetermined threshold level and selectively coupled to the first circuit means for developing a first signal representative of the average noise-signal power or to the second circuit means for developing a second signal representative of the average power of the periodic-pulse and noise components during the pulse intervals, the first and second signals being jointly representative of the relative average powers of the periodic-pulse and noise components during the pulse intervals. The signal-developing circuit preferably comprises a triggered recurrent-pulse generator 40 for developing first recurrent pulses at a first trigger rate representative of the average noise-signal power and for developing second recurrent pulses at a second trigger rate representative of the average power of the periodic-pulse and noise components during the pulse intervals, the second trigger rate being adjustable to substantially equality with the first rate in response to adjustment of the average periodic-pulse power during the pulse intervals to provide a predetermined signal-to-noise power ratio.

The triggered pulse generator 40 may be, for example, a so-called "one-shot" or monostable multivibrator circuit of a conventional cathode-coupled type, employing normally conductive tube 26 and normally nonconductive tube 25 coupled, as shown in Fig. 1, to the video-frequency amplifier 23 by means of a condenser 29 and a diode 30. A grid-leak resistor-coupling condenser network 33, 32 in the input circuit of the tube 26 primarily determines the duration of the nonresponsive or recovery intervals of the multivibrator 40, which preferably is substantially equal to the duration of the intervals between the periodic-pulse components supplied by the second circuit means including the attenuator 24 and the amplifier 23. The anode-cathode circuits of the tubes 25 and 26 include a common cathode bias resistor 41 for maintaining one of the tubes non-conductive while the other is conductive. The anode circuit of the tube 25 includes a load resistor 34 and a meter 31, suitably by-passed by a parallel-connected condenser 42, for indicating the average value of the recurrent-pulse anode-cathode current of the tube 25 while the anode circuit of the tube 26 includes an anode load resistor 43. The control electrode of the tube 25 is connected to a voltage-divider bias circuit comprising resistors 44 and 45.

*Operation of Fig. 1 system*

Considering for the moment the general operation of the system for indicating the sensitivity of receiver units 11–15, inclusive, of Fig. 1, the magnitude of the output noise-signal power inherently generated by the receiver units is indicative of receive sensitivity. The magnitude of output noise-signal power may be represented by that magnitude of pulse-signal power supplied by the signal generator 10 which provides a predetermined signal-to-noise power ratio, for example, a ratio of approximately 1.5 at the output circuit of the receiver. The greater the pulse-signal power required to provide the predetermined signal-to-noise power ratio, the smaller the receiver sensitivity and vice versa. The predetermined signal-to-noise power ratio may be indicated by the signal-to-noise responsive system 16 by a first indication representative of receiver output noise-signal power and a second indication representative of receiver output noise-signal power plus receiver output pulse-signal power, as will be more fully explained subsequently.

A preliminary calibration of the meter 31 ordinarily is desirable to indicate on the meter the trigger rate of the multivibrator 40 corresponding to the repetition rate of the periodic pulses supplied by the generator 10. For this purpose, the switch 20 is placed in its second operating position y and the switch 18 ganged thereto closes, thus enabling the signal generator 10. The pulsed signal generator 10 then supplies periodic pulses or bursts of radio-frequency energy to the radio-frequency amplifier 11 which amplifies the radio-frequency pulses and supplies them to the modulator 12 wherein they beat with a signal from the oscillator 15 to provide periodic pulses of intermediate-frequency energy corresponding to the original radio-frequency pulses. These intermediate-frequency periodic pulses are supplied to the intermediate-frequency amplifier 13 wherein they are amplified and then supplied to the detector 14.

At the output circuit of the intermediate-frequency amplifier 13, the intermediate-frequency periodic pulses corresponding to the original radio-frequency periodic pulses may be considered as brief periodic pulses individually comprising several cycles of sinusoidal intermediate-frequency current flow represented by the expression:

$$I_p = P \cos pt \quad (1)$$

where:

$I_p$ = instantaneous magnitude of sinusoidal-current flow during pulse intervals
$P$ = peak value of sinusoidal-current flow
$p$ = angular frequency of the sinusoidal-current flow
$t$ = time The noise signal inherently generated within the receiver units 11–13, inclusive, and 15 causes a noise-current flow at the output circuit of the intermediate-frequency amplifier 13 which varies in amplitude in a random manner and has frequency components which lie within a frequency range corresponding to the pass band of the intermediate-frequency amplifier 13. During pulse intervals, the sinusoidal-current flow adds to the random noise-current flow so that the resultant current flow during pulse intervals is represented by the expression:

$$I(t) = I_p + I_N \quad (2)$$

where:

$I(t)$ = instantaneous magnitude of resultant current flow during pulse intervals
$I_N$ = instantaneous magnitude of noise-current flow The signal-to-noise current ratio $a$ of the peak value of the pulsed sinusoidal-current flow to the root-mean-square or R. M. S. value of the noise-current flow is represented by the expression:

$$a = \frac{P}{\text{R. M. S.} \, I_N} \quad (3)$$

where R. M. S. $I_N$ = R. M. S. value of noise-current flow.

Accordingly, the signal-to-noise power ratio S at the output circuit of the intermediate-frequency amplifier 13 may be represented by the expression:

$$S = a^2 \qquad (4)$$

The resultant intermediate-frequency signal comprising periodic-pulse and noise components is applied to the detector 14. The detector 14 removes the instantaneous intermediate-frequency variations, thereby developing an output signal corresponding to the the video-frequency components representing the envelope of the resultant intermediate-frequency signal. The video-frequency components representative of the envelope of the periodic-pulse component of the intermediate-frequency signal prior to detection are unidirectional periodic-current pulse components of rectangular shape, while the video-frequency components representative of the envelope of the intermediate-frequency noise component are unidirectional components of random varying amplitude.

The resultant video-frequency detected envelope signal of the combined noise and periodic-pulse components is applied through the switch 20, the video-frequency attenuator 24, the voltage divider 22, the video-frequency amplifier 23, the coupling condenser 29, and the diode 30 to the input circuit of the multivibrator 40. This envelope signal, considered as a current-envelope signal applied to the multivibrator 40, then is effective to render the normally conductive tube 26 nonconductive when the envelope signal exceeds a predetermined level which will be denoted as the current-threshold level of the multivibrator 40. This threshold level is determined primarily by the control electrode-cathode bias of the tube 26. When the tube 26 is rendered nonconductive by an envelope-signal variation, the tube 25 becomes conductive because of the decreased control electrode-cathode bias developed across the resistor 41 when the tube 26 ceases to conduct. A resulting decrease in the anode potential of the tube 25 is applied through the condenser 32 to the control electrode of the tube 26, thus maintaining the tube 26 nonconductive. The tube 26 remains nonconductive for an interval determined primarily by the time constant of the condenser 32 and the resistor 33 of the input circuit of tube 26. This nonconductive or recovery interval preferably is substantially equal to the duration of the intervals between the pulse components supplied to the input circuit of the multivibrator 40. At the end of the recovery interval, the tube 26 again becomes conductive because of the increased control-electrode potential thereof and the tube 25 is rendered nonconductive by the increase of control electrodes-cathode bias developed across the resistor 41 due to current flow through the tube 26.

During the recovery interval, the multivibrator 40 is incapable of responding to variations of the envelope signal in excess of the threshold level because the tube 26 is nonconductive. After the recovery interval, the multivibrator 40 remains with tube 26 conductive and tube 25 nonconductive until the envelope signal thereafter exceeds the multivibrator threshold level at which time the transfer-of-conduction process is repeated. Accordingly, the anode-cathode current of the tube 25 comprises recurrent pulses having an average recurrence rate and thus an average value which is representative of the average rate at which the envelope signal exceeds the multivibrator threshold level. The average value of the anode-cathode current is indicated by the meter 31 in the anode circuit of the tube 25.

To obtain the desired preliminary calibration of the meter 31, the amplitude of the output signal of generator 10 is adjusted, by adjustment of a suitable parameter thereof, until the multivibrator 40 is triggered at a rate corresponding to the repetition rate of the generator 10. This rate is indicated by the meter 31 of the multivibrator 40 when the meter indication reaches a maximum value that does not change for further increases in the amplitude of the signal generator 10 output signal. This is so because the portion of the envelope signal which exceeds the threshold level primarily comprises the periodic-pulse component in combination with the noise signal rather than the noise signal alone as it occurs during intervals between periodic pulses. Accordingly, a maximum meter indication corresponds to triggering of the multivibrator during substantially all periodic-pulse intervals. Since the recovery interval of the multivibrator 40 preferably is substantially equal to the duration of the intervals between the pulses, this trigger rate also substantially corresponds to the maximum possible trigger rate for a random noise signal alone or for any magnitude combination of noise signal and periodic-pulse components supplied by units 11–15, inclusive.

As previously mentioned, a predetermined signal-to-noise power ratio S, for example, a ratio of approximately 1.5, may be represented by two indications of the signal-to-noise responsive system 16 after the calibration step just explained. The first indication is representative of noise-signal power alone and may be provided by the following procedure. The switch 20 is initially thrown into its first operating position $x$ and the switch 18 ganged thereto is simultaneously opened to disable the signal generator 10. In this operating condition, the detected envelope signal comprising only video-frequency components derived from the noise signal internally generated in the receiver units 11–15, inclusive, is supplied through the switch 20 and the voltage divider 22 to the video-frequency amplifier 23 wherein it is amplified and applied to the multivibrator 40. The voltage divider 22 then preferably is adjusted until the multivibrator 40 is triggering at some convenient rate less than the previously indicated maximum rate corresponding to the repetition rate of the generator 10.

Figure 2:
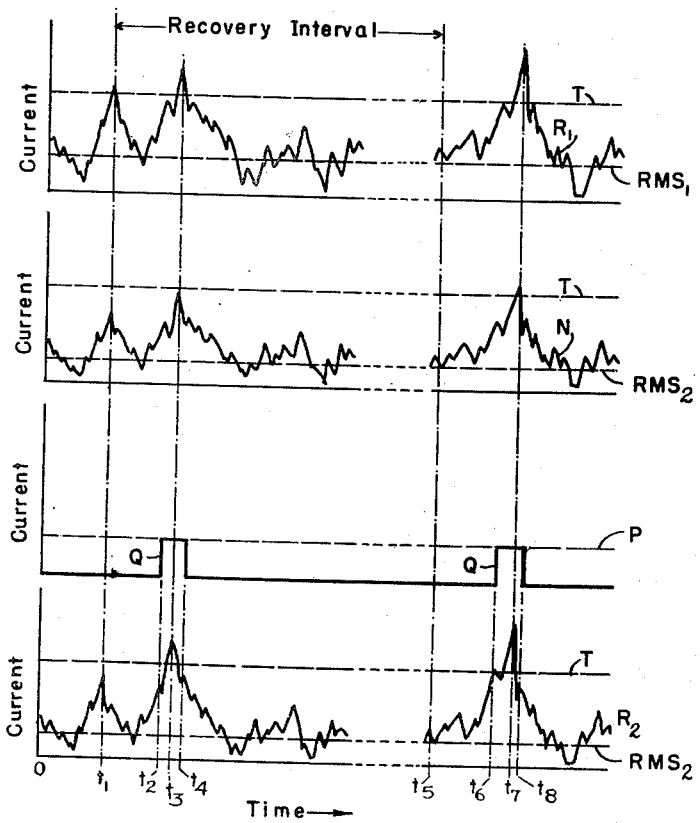
Fig. 2 is a group of graphs used in explaining the operation of the signal-to-noise responsive system.

Curve $R_1$ of Fig. 2 represents the instantaneous noise-envelope current signal at the input circuit of the multivibrator 40, while curve R. M. S.₁ represents the root-mean-square value of that noise-envelope signal. The amplitude of the noise-envelope signal fluctuates, in a random manner with time and, as shown by the representative example of curve $R_1$, exceeds the multivibrator threshold level, represented by curve T of Fig. 2, at, for example, times $t_1$, $t_3$, and $t_7$. Not all of these excess variations, however, are effective to trigger the multivibrator 40 because of the time interval required for recovery of the multivibrator after a previous triggering operation. Thus, in Fig. 2 the excess variation of the signal at time $t_3$ does not cause a new triggering of the multivibrator 40 because it occurs during the recovery interval $t_1$—$t_5$ following the triggering due to the excess variation at time $t_1$. The excess variation of the noise-envelope signal occurring at time $t_7$ is effective to trigger the multivibrator 40 as it occurs after the recovery interval $t_1$—$t_5$.

The multivibrator 40 is thus triggered at a rate representative of the rate at which the envelope signal exceeds the threshold level T. It is known that the average rate at which the noise-envelope signal exceeds the threshold level T is a function of the R. M. S. value of the noise-current flow, the average rate of excess variations being greater for greater R. M. S. values of noise-current flow. Accordingly, the multivibrator 40 trigger rate is representative of the R. M. S. value of noise-current flow, and hence, of noise-signal power.

Figure 3:
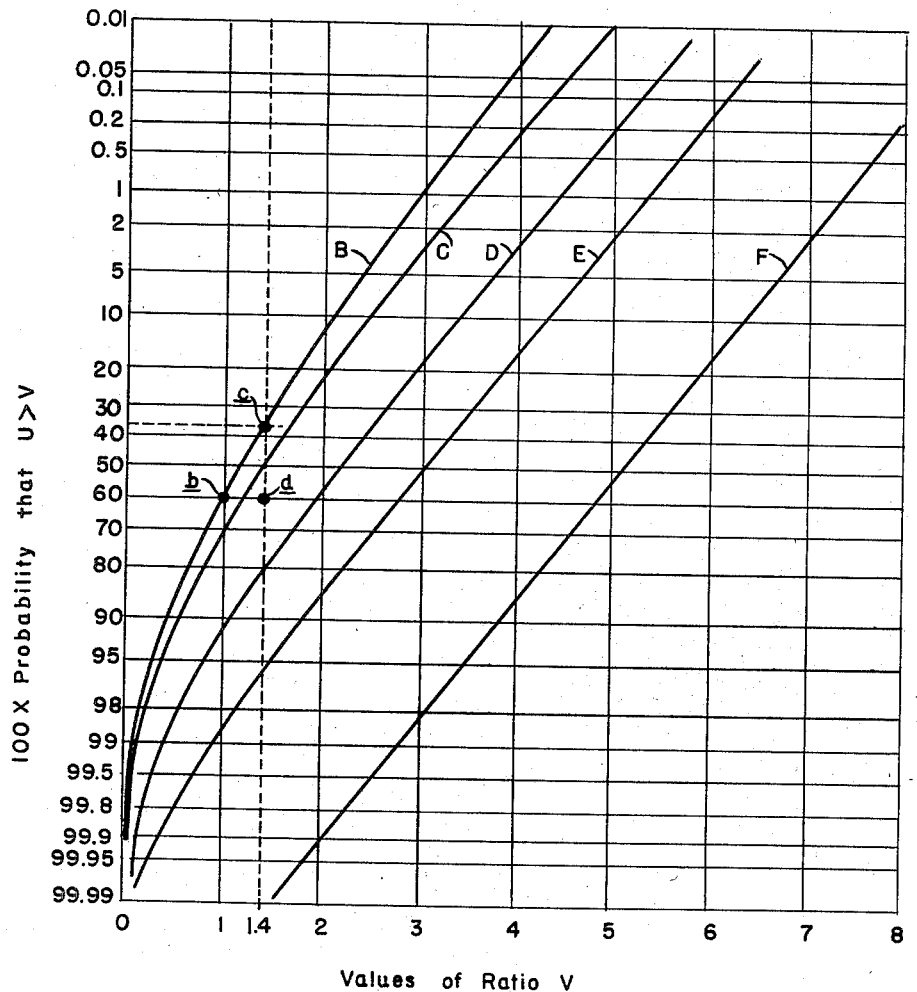
Fig. 3 is a graph showing the probability distribution of random electrical noise.

The significance of the average trigger rate of the multivibrator 40 may best be explained by the consideration of an example with reference to Fig. 3 which is a graph of the probable amplitude distribution of envelope signals of combined noise and pulsed sinusoidal-current components at the input circuit of the multivibrator 40 for various values of the signal-to-noise current ratio $a$ at the input circuit of the linear detector 14. The abscissas of the Fig. 3 graph represent independently variable values of the ratio V where:

$$V = \frac{T}{\text{R. M. S. } I_M} \quad (5)$$

and $T=$ an arbitrarily selected current-threshold level of the input circuit of the multivibrator 40

R. M. S. $I_M=$ R. M. S. value of the noise-envelope signal at the input circuit of the multivibrator 40

The ordinates correspond to the probability that the ratio U is greater than a selected value of V where:

$$U = \frac{R}{\text{R. M. S. } I_M} \quad (6)$$

and:

$R=$ magnitude of the envelope signal at the input circuit of the multivibrator 40 for any combination of noise and pulsed sinusoidal-current components.

The family of curves B, C, D, E, and F of Fig. 3 correspond to values of signal-to-noise current ratio $a$ of 0, 1, 2, 3, and 5, respectively. The Fig. 3 graph was derived from a corresponding graph in an article entitled "Mathematical Analysis of Random Noises" by S. O. Rice which appeared in the January 1945 issue of The Bell System Technical Journal.

Assume now, for example, that the average rate at which the noise-envelope signal exceeds the threshold level T of the multivibrator 40 corresponds to 60 percent of the total opportunities available for such excess variation. This means that the probability of an excess variation is 60 percent. The average triggering rate of the multivibrator 40 is less than the average rate of excess variation because of the presence of the multivibrator recovery intervals. The probability of the multivibrator being triggered is, however, the same as the probability that an envelope-signal variation will exceed the threshold level, namely, 60 percent. This is so because changes in the time distribution during which the multivibrator 40 is responsive to input signals alters the number of opportunities for both excess and nonexcess variations during these responsive intervals by the same factor. In other words, probability is dependent on the number of opportunities for an event to occur, but is not dependent on the time sequence in which the opportunities arise. As explained previously, the multivibrator recovery interval and the duration of the intervals between periodic pulses supplied by the generator 10 are preferably substantially equal, so that the previously determined maximum triggering rate corresponding to the repetition rate of the periodic pulses is representative of 100 percent probability. Accordingly, since the present triggering rate has been assumed to represent 60 percent probability, the meter indication of the multivibrator 40 is now equal to 60 percent of the previously determined maximum value.

Referring now to the Fig. 3 graph, curve B represents the probability that the noise-signal envelope, expressed in terms of the ratio U, will exceed the threshold level, expressed in terms of the ratio V, when $a$ is zero. Since the probability of a noise-signal envelope variation in excess of the threshold level is 60 percent, the operating point of the system 16 is represented by point $b$ on curve B of Fig. 3. Point $b$ corresponds to a value of the ratio V of unity or, in other words, under these operating conditions the R. M. S. value of noise-envelope signal equals the current threshold level T. There is provided, therefore, a first indication of the noise-signal output power of receiver units 11–14, inclusive.

The second indication to be provided by the signal-to-noise responsive system 16 is an indication of noise-signal power plus pulse-signal power. For this purpose, the switch 20 is thrown into its second operating position y, thereby coupling the video-frequency attenuator 24 between the output circuit of the detector 14 of the receiver and the input circuit of the video-frequency amplifier 23. The ganged switch 18 of the signal generator 10 simultaneously closes, causing pulse components to be supplied to the signal-to-noise responsive system 16 in addition to the previously mentioned noise components.

Curve N of Fig. 2 represents the envelope signal of the noise component at the output circuit of the video-frequency amplifier 23 with the video-frequency attenuator 24 coupled in circuit. Broken-line curve R. M. S.$_2$ of Fig. 2 represents the R. M. S. value of the attenuated noise component. Assuming, for example, that the video-frequency attenuator has an attenuation factor of 3 decibels, then the noise-signal power is one-half its former value under the previously described operating condition. Accordingly, the envelope and R. M. S. value of the noise-current component are approximately 70 percent of their previous values. The probability of an envelope-signal variation's exceeding the threshold level because of the noise component alone has thus been reduced. In connection with the Fig. 3 graph, the decrease in the R. M. S. value of the noise current increases the value of the ratio V representative of the threshold level of multivibrator 40 to approximately 1.4 because, as represented by Equation 5, the ratio V is inversely proportional to the R. M. S. value of the noise current, as previously mentioned. With the attenuator 24 coupled in circuit, therefore, the operating point on curve B of Fig. 3 is thus shifted to the point $c$ which corresponds to 37 percent probability and, hence, an average multivibrator trigger rate of 37 percent of the previous maximum rate corresponding to the repetition rate of the generator 10.

Curve Q of Fig. 2 represents periodic-pulse components supplied to the signal-to-noise responsive system 16 by the detector 14 and occurring during the time intervals $t_2$—$t_4$ and $t_6$—$t_8$. The peak magnitude of these pulse components at the input circuit of the multivibrator 40 is represented by broken-line curve P of Fig. 2. These pulse components are supplied to the system 16 in combination with the attenuated noise components. The amplitude of the output signal of generator 10 may then be adjusted until the meter 31 of the multivibrator 40 indicates the same triggering rate and, hence, the same probability of, for example, 60 percent as established during the operation previously explained by the unattenuated noise-signal envelope alone. The combined noise-signal and pulse-component envelope is then represented by curve R$_2$ of Fig. 2.

Referring again to the Fig. 3 graph, because the attenuated R. M. S. value of the noise component is not changed by the addition of pulse components, the value of V representative of the threshold level of the multivibrator 40 remains constant at the value at 1.4. The addition of pulse components which increases the probability of triggering, therefore, causes the operating point to move along a constant-V line from point $c$ to point $d$ which represents 60 percent probability and the original triggering rate. The point $d$ represents a specific signal-to-noise current ratio $a$ of approximately 1.2 as indicated by interpolation between curves C and D and, consequently, from Equation 4 a given signal-to-noise power ratio S of approximately 1.5. The signal-to-noise power ratio S established in this manner is dependent on the shift in V caused by the insertion of the attenuator 24 and, therefore, the value of the attenuator. The meter 19 of the generator 10 then provides an indication of the pulse-signal power required to establish the predetermined signal-to-noise power ratio. The magnitude of the pulse-signal power is representative of the receiver sensitivity.

While applicant does not intend to limit the invention to any particular design constants, the following values have been found suitable for the multivibrator 40 of the signal-to-noise responsive system 16 of the invention:

| Component | Value |
|---|---|
| Condenser 29 | 0.01 microfarad. |
| Condenser 32 | 470 micromicrofarads. |
| Condenser 42 | 0.01 microfarad. |
| Resistor 33 | 1 megohm. |
| Resistor 34 | 470,000 ohms. |
| Resistor 41 | 1000 ohms. |
| Resistor 43 | 22,000 ohms. |
| Resistor 44 | 1 megohm. |
| Resistor 45 | 50,000 ohms. |
| Tube 25 | 1 section of type 12AT7. |
| Tube 26 | 1 section of type 12AT7. |
| Tube 30 | 1 section of type 6AL5. |
| Source +B | +250 volts. |

From the foregoing description, it will be apparent that the signal-to-noise responsive system 16, constructed in accordance with the present invention, has the advantage of indicating the signal-to-noise power ratio of a receiver in response to pulses of small duty cycle applied thereto by providing signals accurately representative of noise power and signal-plus-noise power and also has the advantage of providing precisely readable indications thereof.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A signal-to-noise responsive system comprising: first circuit means including switching means having a first operation position for enabling said first circuit means to supply a noise signal having a predetermined average power; second circuit means including signal-attenuating circuit means and said switching means having a second operating position for enabling said second circuit means to supply a signal comprising attenuated components of said noise signal and periodic-pulse components of adjustable power having intervals of predetermined duration between pulses; and a triggered recurrent-pulse generator selectively coupled to said first circuit means and having a first trigger rate representative of said average noise-signal power or to said second circuit means and having a second trigger rate representative of said average power of said periodic-pulse and noise components during said pulse intervals, said generator being nonresponsive to said noise signal during intervals having a predetermined duration which is substantially equal to that of said intervals between said pulses, and said second trigger rate being adjustable to substantial equality with said first rate in response to adjustment of said average periodic-pulse power during said pulse intervals to provide a predetermined signal-to-noise power ratio.

2. A signal-to-noise responsive system comprising: first circuit means for supplying a noise signal having a predetermined average power; second circuit means including signal-attenuating circuit means for supplying a signal comprising periodic-pulse components of adjustable power and attenuated components of said noise signal; and a triggered pulse generator selectively coupled to said first circuit means and having a first trigger rate representative of said average noise-signal power or to said second circuit means and having a second trigger rate representative of the average power of said periodic-pulse and noise components during the pulse intervals, said second trigger rate being adjustable to substantial equality with said first rate in response to adjustment of said average periodic-pulse power during said pulse intervals and said first and second trigger rates being jointly representative of the relative average powers of said periodic-pulse and noise components during said pulse intervals.

References Cited in the file of this patent

UNITED STATES PATENTS

| Number | Name | Date |
|---|---|---|
| 2,440,261 | Ginzton | Apr. 27, 1948 |
| 2,455,996 | Harvey | Dec. 14, 1948 |
| 2,498,676 | Grieg | Feb. 28, 1950 |
| 2,548,684 | Roth | Apr. 10, 1951 |
| 2,603,742 | Larson | July 15, 1952 |
| 2,691,098 | Selove | Oct. 5, 1954 |